United States Patent
Ondrisek (10) Patent No.: US 10,548,196 B2
(45) Date of Patent: Jan. 28, 2020

(54) LIGHT SYSTEM FOR DETECTING THE PRESENCE OF INDIVIDUALS BY USING LIGHT HAVING A DIFFERENT SPECTRUM

(71) Applicant: TRIDONIC GMBH & CO KG, Dornbirn (AT)

(72) Inventor: Thomas Ondrisek, Vienna (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 8 days.

(21) Appl. No.: 15/531,064

(22) PCT Filed: Dec. 18, 2015

(86) PCT No.: PCT/EP2015/002564
§ 371 (c)(1),
(2) Date: May 26, 2017

(87) PCT Pub. No.: WO2016/110304
PCT Pub. Date: Jul. 14, 2016

(65) Prior Publication Data
US 2017/0332455 A1    Nov. 16, 2017

(30) Foreign Application Priority Data

Jan. 8, 2015    (DE) ...................... 10 2015 200 133

(51) Int. Cl.
*H05B 33/08*    (2006.01)
*H05B 37/02*    (2006.01)

(52) U.S. Cl.
CPC ..... *H05B 33/0854* (2013.01); *H05B 37/0218* (2013.01)

(58) Field of Classification Search
CPC ....................... H05B 37/0218; H05B 37/0227; H05B 37/02; H05B 37/0245; H05B 33/0845;
(Continued)

(56) References Cited

U.S. PATENT DOCUMENTS

| 4,243,879 A | 1/1981 | Carroll et al. |
| 4,924,416 A | 5/1990 | Sasao |

(Continued)

FOREIGN PATENT DOCUMENTS

| DE | 102004042724 | 4/2005 | |
| DE | 102004042724 A1 * | 4/2005 | ............... G01D 5/26 |

(Continued)

OTHER PUBLICATIONS

German search report dated Aug. 12, 2015 in priority German Application 10 2015 200 133.4.

(Continued)

*Primary Examiner* — Tung X Le
*Assistant Examiner* — Boma Alaeddini
(74) *Attorney, Agent, or Firm* — Andrus Intellectual Property Law (57) ABSTRACT

The invention relates a system for determining a change in a room (1). The invention comprises in particular a self-teaching illuminating system which detects a presence of an individual in an illuminated area. The system comprises lighting means (2) which output light, control means (3) which control the luminous output from the lighting means (2), measuring means (4) which determine a luminous intensity, and an evaluation means (6) which evaluates the luminous intensity determined by the measuring means (4). The evaluation means (6) is designed to detect a change of an object/individual in the room (1), starting from a determined luminous intensity at at least one first time, at which the lighting means (2) outputs no light, and a luminous intensity at at least one second time, at which the lighting means (2) outputs light.

11 Claims, 4 Drawing Sheets

(58) Field of Classification Search
CPC ............ H05B 33/0854; H05B 33/0851; H05B 33/0815; H05B 33/0848; H05B 33/0866; H05B 37/0281; H05B 33/0818; H05B 33/0842; H05B 33/0857; H05B 33/0827; H05B 33/083; H05B 33/0887; H05B 33/0809; H05B 33/0869; H05B 33/0872; H05B 37/0272; Y02B 20/46; Y02B 20/44; Y02B 20/48; Y02B 80/50; F21V 23/0471
See application file for complete search history.

(56) References Cited

U.S. PATENT DOCUMENTS

| | | | | |
|---|---|---|---|---|
| 8,232,742 | B2 * | 7/2012 | Briggs | H05B 33/0842 |
| | | | | 315/250 |
| 9,192,009 | B2 * | 11/2015 | Briggs | H05B 33/0845 |
| 2007/0085157 | A1 | 4/2007 | Fadel et al. | |
| 2007/0176402 | A1 * | 8/2007 | Irie | G06K 9/00362 |
| | | | | 280/735 |
| 2008/0130336 | A1 * | 6/2008 | Taguchi | H02M 1/4225 |
| | | | | 363/125 |
| 2008/0224024 | A1 | 9/2008 | Ashdown | |
| 2010/0171442 | A1 * | 7/2010 | Draper | H05B 33/0869 |
| | | | | 315/297 |
| 2012/0262071 | A1 * | 10/2012 | Briggs | H05B 33/0845 |
| | | | | 315/152 |
| 2012/0326612 | A1 * | 12/2012 | Kirsten | G09F 19/205 |
| | | | | 315/153 |
| 2013/0229112 | A1 | 9/2013 | Van Der Werff | |
| 2013/0293116 | A1 | 11/2013 | Mollins | |
| 2014/0375222 | A1 * | 12/2014 | Rains, Jr. | H05B 37/0245 |
| | | | | 315/158 |

FOREIGN PATENT DOCUMENTS

| | | | |
|---|---|---|---|
| DE | 102004042724 A1 * | 4/2005 | ............ G01D 5/26 |
| DE | 102007028117 | 12/2008 | |
| DE | 202010011569 | 12/2010 | |
| DE | 102009056806 | 6/2011 | |
| DE | 112012000517 | 2/2014 | |
| GB | 2377280 | 1/2003 | |
| WO | 2013158955 | 10/2013 | |

OTHER PUBLICATIONS

International Search Report dated Mar. 31, 2016 in parent PCT Application PCT/EP2015/002564.
Austria Search Report dated Jun. 19, 2018 in co-pending Austria Patent Application GM 104/2015.

* cited by examiner

LIGHT SYSTEM FOR DETECTING THE PRESENCE OF INDIVIDUALS BY USING LIGHT HAVING A DIFFERENT SPECTRUM

CROSS REFERENCE TO RELATED APPLICATION

The present application is the U.S. national stage application of International Application PCT/EP2015/002564, filed Dec. 18, 2015, which international application was published on Jul. 14, 2016 as International Publication WO 2016/110304 A1. The International Application claims priority to German Patent Application 10 2015 200 133.4, filed Jan. 8, 2015.

FIELD OF THE INVENTION

The present invention relates to a system and a method for determining a change of an object in a room. The invention comprises in particular a self-teaching illuminating system which detects a presence of an individual in an illuminated area.

BACKGROUND OF THE INVENTION

The use of special motion sensors is known for both the control of room lighting and in the outdoor area of buildings in addition to using switches and dimmers. Besides the advantageous automatic operation of the lighting means, motion sensors enable expanded possibilities to save on energy used for lighting. However, it is a disadvantage that additional effort is required on the device end for the motion sensors monitoring the area to be illuminated.

DE 20 2010 011 569 U1 reveals a device designed for brightness-dependent lighting. The device shown comprises means to detect a brightness level in an area illuminated by one or several light sources as well as means to regulate the brightness of at least one of the light sources. The regulation of the brightness thereby takes place at least partly based on the brightness detected in the illuminated area and a brightness value. The device shown thus enables a dynamic regulation of the lighting depending on the ambient lighting. The means for detecting the brightness is thereby disposed in the illuminated area, or in the area illuminated at least indirectly through reflection.

DE 10 2009 056 806 A1 shows an illuminated advertising that displays a printed circuit board supporting at least one lighting means. A brightness sensor is arranged on the printed circuit board which measures the ambient brightness. A control device controls a power supply of the at least one lighting means, so that a luminous intensity emitted by the lighting means increases with an increasing ambient brightness. The illuminated advertising is thereby operated with a brightness adapted to the ambient brightness.

The prior art, however, shows the measurement of brightness and the operation of a lighting means depending on a measured brightness, an evaluation of the measured brightness with regard to information contained in brightness measurements is however omitted. The detection of a reflected light in terms of its brightness is however definitely mentioned, but an evaluation of this brightness is not done.

It is a task of the present invention to detect a change of a reflecting object in a room with as little effort as possible.

SUMMARY OF THE INVENTION

The system according to the invention to determine a change in a room comprises lighting means suited to output light, control means designed to control the luminous output of the lighting means, measuring means for determining a luminous intensity, and an evaluation means for evaluating the determined luminous intensity and to generate a switch signal for the control device based on the evaluation of the luminous intensity measured. The system according to the invention is characterized by the fact that the evaluation means is designed to detect a change of an object in a room, based on a determined luminous intensity at at least one first time, at which the lighting means outputs no light, and a determined luminous intensity at at least one second time, at which the lighting means outputs light.

The design according to the invention makes it possible, at at least the first time, at which the lighting means outputs no light, to determine a luminous intensity (brightness), which forms a reference for the determination of the change of the reflection ratio in a room illuminated by the lighting means. The luminous intensity determined at the first time is exclusively determined by parts of the light that are not caused by the lighting means. The luminous intensity determined by the measuring means at the first time is generated, in particular, through ambient light, such as natural ambient light, and through other light sources but not the lighting means of the system according to the invention.

The determination of a change of an object in the room is now done through the detection of a change of the reflection ratio in the room by means of a luminous intensity determined at at least a second time, at which the lighting means emits light to detect a change of an object in the room. For example, such a change of the reflection ratios in the illuminated room can be caused by the movement of a person in the room. The system according to the invention thus makes it possible in a simple manner to recognize a person entering the illuminated room.

As opposed to the prior art, in which specialized additional detection devices, such as motion sensors, are dedicated to the task of detecting persons, this takes place according to the invention through a suitable evaluation of the light emitted and reflected through the lighting means and can thus easily be detected by means of one or several photo sensors. It is therefore particularly advantageous, if the system according to the invention is part of an illuminating system, wherein the measuring means, e.g. photodiodes, are dedicated to the lighting means and disposed inside or on a housing of a lighting means. The integrated design of the illuminating system, having a lighting means simultaneously provided for illuminating the room allows for an especially simple manufacture and assembly of the illuminating system according to the invention.

An advantageous design of the system is characterized by the fact that the control means controls the measuring means. In particular, the control means can be designed, depending on the detected change of the object, to change the luminosity of the light emitted by the lighting means. Based on a detected presence of a person, the luminosity of the illumination of the room can thus be triggered through the lighting means.

It is furthermore advantageous that the evaluation means can be designed to determine a change of the proportion of light reflected by an object in the room from a ratio of the luminous intensity at the at least first time, and a luminous intensity at the at least second time, in order to detect a presence of a person in the room.

In a preferred embodiment of the system according to the invention, the evaluation means is designed, by learning from the determined luminous intensity at the at least first time, and a luminous intensity at the at least one second time, to decide whether a person is present in the room. The learning or training of the system can take place in connection with an installation of the system, for example. By training the system, it is further possible to distinguish the change of a position of a person in the room from a light situation. A change of a light situation can be the result of pulling a white piece of paper out of an office desk, for example.

Training the system to detect a change in an object and to understand the relevance of a determined change in the reflection ratios can be based on a neural network.

In the system according to the invention, light comprises ambient light at the at least one first time, and the light is composed of ambient light and reflected light at the at least second time.

The system may furthermore comprise a measuring means that contains a daylight sensor (ALS—Ambient Light Source).

In one preferred embodiment, the control means is configured to start a burst operation of a lighting means, when the daylight sensor determines a luminous intensity below a daylight threshold, and if the lighting means are switched off. The burst operation of the lighting mean is short-term, to verify the reflective properties of the room in regular intervals during this burst operation.

It is advantageous, if the system comprises an evaluation means that determines a part of the determined light from a determined luminous intensity at the at least one second time, which is generated in the room through further lighting means with a defined operating frequency.

The lighting means can comprise at least one lighting element and at least one further lighting element, wherein the at least one lighting element and the at least one further lighting element usually emit light in a spectrum distinguishable from one another. When the evaluation means evaluates the luminous intensity determined in the spectrums distinguishable from one another in each case, a recognition of a change of an object in the room or the detection of a person can be executed with a further improved reliability through the resulting spectrum-dependent reflection measurement.

The technical task is also solved according to the invention by means of a method for determining a change in a room. The method thereby uses a system comprising lighting means which output light, control means which control the luminous output of the lighting means, measuring means, which determine a luminous intensity, and evaluation means, which evaluate the determined luminous intensity and a switch signal for the control device (3) based on the evaluation of the luminous intensity. The method according to the invention is characterized by the fact that in a first step of the measuring, a luminous intensity is first determined at at least one first time, at which the lighting means outputs no light, and in a second step, a luminous intensity is determined at at least one second time, at which the lighting means outputs light. A change of an object in the room is detected in an evaluation step based on the luminous intensity determined at the at least first time, and the luminous intensity at the at least one second time.

The technical problem is solved in an advantageous manner through a computer program with program code means, to be able to perform all steps according to the method when the program is executed on a computer or a digital signal processor.

The invention is explained in greater detail below by means of the enclosed figures.

DETAILED DESCRIPTION

Elements with the same function are described in the figures using the same reference signs.

Figure 1:
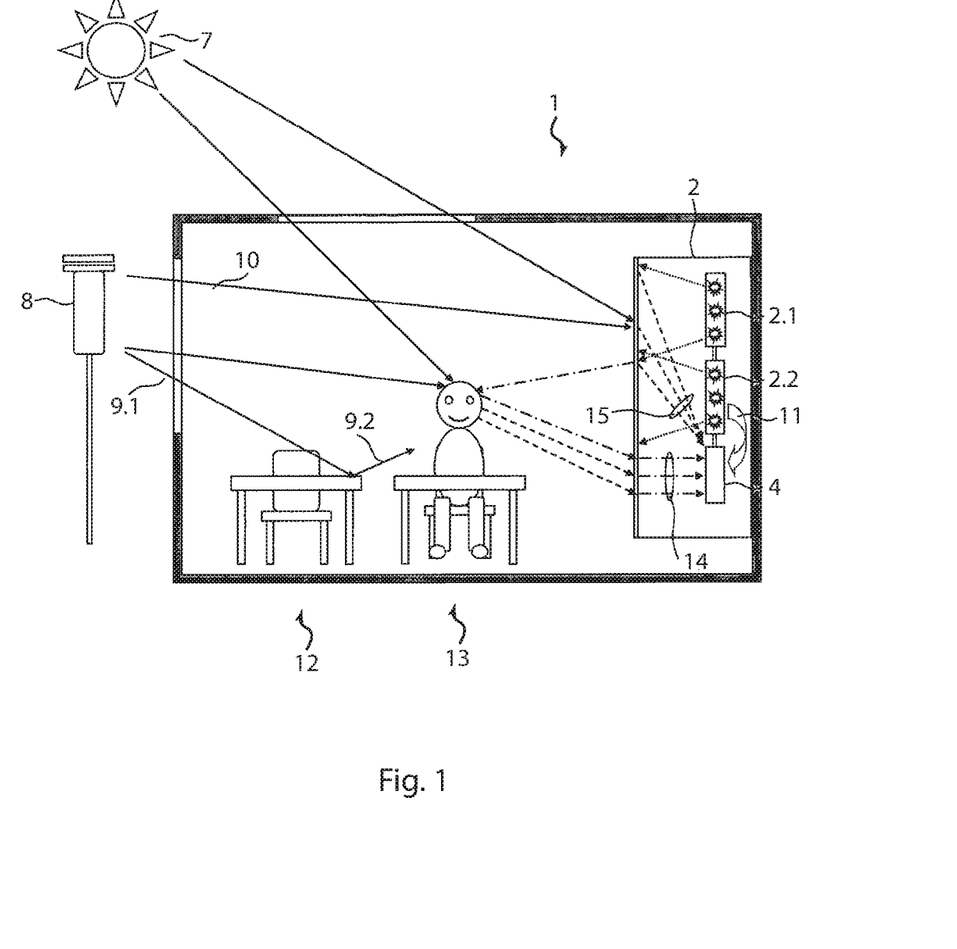
FIG. 1 is an overview of an embodiment of a self-teaching system for illuminating a room according to the present invention.

FIG. 1 gives an overview of an embodiment of a system for illuminating a room according to the invention. The depicted system comprises a lamp 2 arranged in a room 1. In the example shown, the lamp 2 comprises several lighting elements 2.1, 2.2 on the one hand, and a measuring means 4 on the other hand. The lighting means 2.1, 2.2, can comprise LEDs or LED modules with a multitude of single LEDs, for example, and can be arranged in a joint housing with the respective control switches and the measuring means 4. In one embodiment, the measuring means 4 is a photodiode that is dedicated to the lamp 2. The lamp can be a lamp 2 among several, or the only lamp 2 that illuminates the room 1 with artificial light.

It is especially advantageous, if the measuring means 4 (photodiode, photo sensor) with the assigned evaluation switches is part of a ballast and control unit placed upstream of the lighting means 2.1, 2.2, and if it is integrated with it, for example. The measuring means 4 measures the incident light, and depending on the strength of the incident light, creates an output signal.

If the measuring element 4 is a photodiode, a photocurrent is generated by the incident light depending on the intensity of the incident light.

Further sources that supply the room 1 with light are represented by natural light sources 7 such as the sun, and artificial light sources 8, such as street lighting. These natural and additional artificial light sources 7, 8 can be arranged both inside and outside the room. The artificial light sources 8 also comprise further lighting means that output light.

The light sources 4, 7, and 8 shown produce both light 10 that directly hits the photodiode, and reflected light 9.1, 9.2, which is reflected by objects in the room and which can fall onto the photodiode as reflected light 9.2.

There can also be a further incident light component 11 through the lighting means 2.1, 2.2, which generates a respective photocurrent in the photodiode and is thus detected as light.

Furthermore, there is talk about light and the reflection. Light is thereby understood as the light radiation in a spectrum, as it is usually emitted by common lighting fixtures. In the following, reflection is understood as the reflection of light at boundaries, therefore the electromagnetic radiation in the optical or visible spectral range.

An object located in the room 1 reflects incident light at least partially regardless of the source of light. An object or an item in the room can be a workplace 12, for example. The intensity and direction of the reflected light depends on the shape and the surface of the object and on the light source. A person 13 at a workplace will therefore show a different reflective behavior with regard to the incident light, as opposed to the unmanned workspace 12. The room 1 is therefore distinguished by a characteristic reflection pattern depending on the quantity and the consistency of the objects in the room 1.

A change of an object from a first time t1 to a second time t2 will result in a change of the reflective properties of the room 1. Such a change of an object is a movement of a person in the room, for instance. A person entering or leaving a room is of particular significance in connection with lighting systems, and is expressed by a change of the reflective properties of the light of the room 1. A change of an object in the room 1 is therefore connected to a change in the reflection pattern.

The incident light detected on the measuring system comprises usable light components 14, on the one hand, which reaches the measuring means 4 through reflections on boundaries of objects the room 1. On the other hand, the detected light further comprises parasitic light components 15 that stem directly from the individual light sources, such as natural light sources 7, artificial light sources 8 as well as the lighting means 2.1, 2.2 themselves, and where there was no reflection from the objects in the room 1. While the usable light components 14 contain information about objects in the room 1 in their intensity and spectral distribution, the parasitic light components 15 do not carry any such information about objects in the room. To exclude the influence of the lighting means 2.1, 2.2, these can be blocked from the measuring means.

Figure 2:
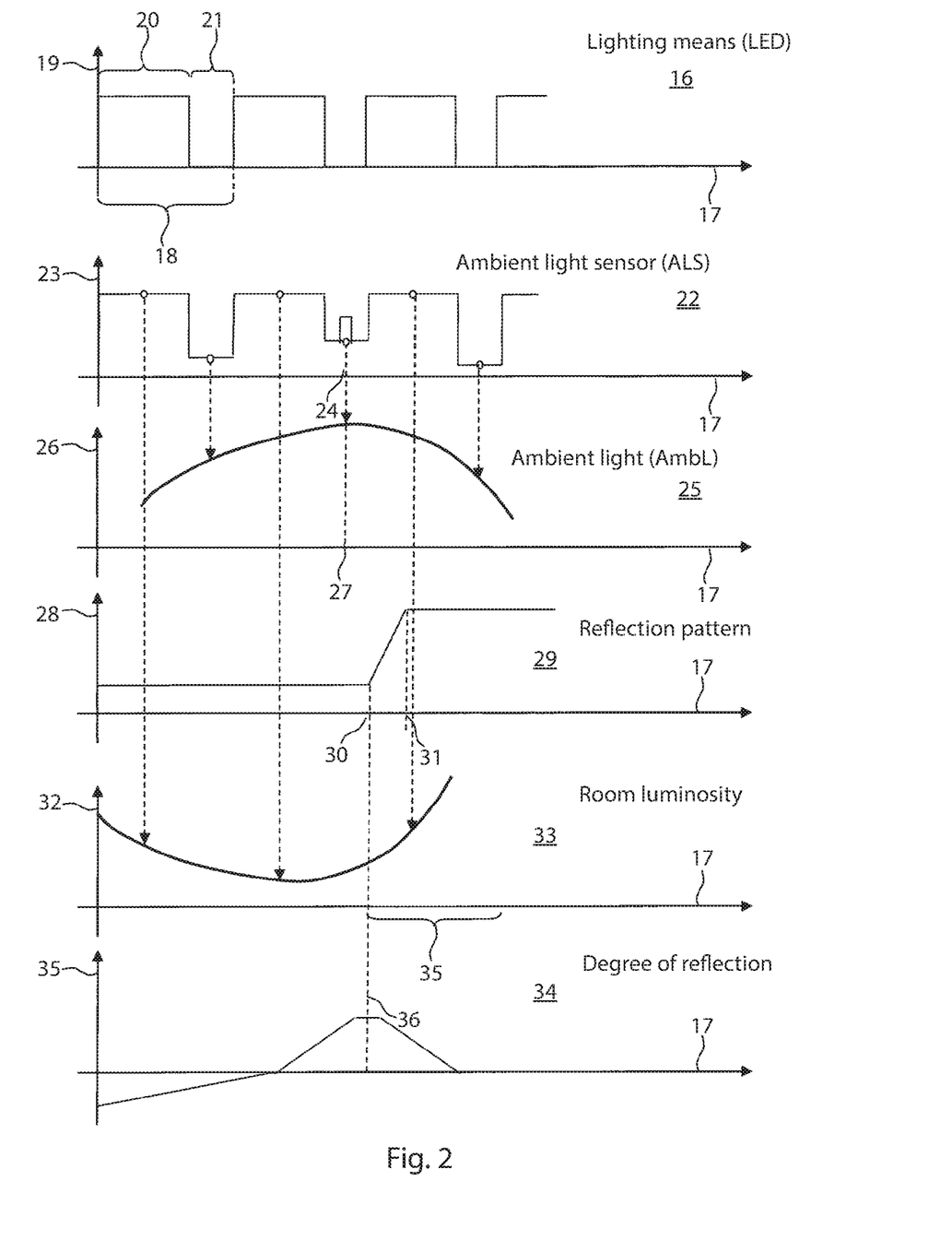
FIG. 2 shows plots of an embodiment of a system for illuminating a room according to the present invention.

An embodiment of a self-teaching system for the illumination of a room according to the present invention is explained by means of FIG. 2. Without limitation to the generality it is understood that the lighting means 2.1, 2.2 are designed as LEDs. It is also understood that the LEDs are controlled through pulse width modulation (PWM operation). If the on and off period of the pulses is selected suitably, the human eye only perceives the average luminous intensity of the LEDs. The intensity of the light emitted by the LED can thus be controlled linearly with the duty cycle of a control voltage. The switch frequency must thus be set sufficiently high (for example, 10 kHz). The temporal course 16 of the light output of the lighting means 2.1, 2.2 is shown in FIG. 2. The time t is shown on the horizontal axis. The intensity of the light output of the lighting means 2.1, 2.2 (LED) is represented on the vertical axis 19. In a first time span 20, the LED light outputs a certain intensity. In a second time span 21, the LED is however switched off and does not output any light. It repeats this process for each period 18, whereby these time spans 21, 22 form one period.

The temporal course 17 of the measurement or measured luminous intensity of the ambient light sensor 4 is furthermore shown in FIG. 2. The time t is plotted on the horizontal axis. The determined luminous intensity is plotted on the vertical axis 23. In a first time span 20, the LED light emits a certain intensity. In a second time span 21, the LED is however switched off and doesn't emit any light. During the second time span 21, the ambient light sensor 4 will merely measure ambient light. In FIG. 2, a disturbance through incident light 24 is measured by the ambient light sensor 4 in the second period 18. This incident light will be emitted by another lighting means located in the room 1, for example.

The temporal course of the ambient light (AmbL) 25 is represented as a continuous time curve 25. The luminous intensity determined by the ambient light sensor 4 at discrete times is thereby plotted in direction of the vertical axis 26. According to the invention, the ambient light is measured at first times, at which the lighting means 2 does not emit any light, and which are therefore located in the two time spans 21. A disturbance caused by another lighting means is therefore taken into account in the form of a rejection for one time span 27.

The temporal course 29 of a reflective measurement is furthermore represented in FIG. 2. A parameter for the value representative at the respective time for a light reflection for the room 1 is shown in the direction of the vertical axis 28. At a time t1 30, a linear increase starts in the temporal course of the reflection pattern of the room 1 from a first lower reflection measurement to a second higher reflection measurement. As of a time t2 31, the higher value for the reflection measurement of the room 1 is constant again.

Below that, FIG. 2 shows a determined temporal course 33 of the luminous intensity of the room 1. A parameter for the value for the determined luminous intensity for the room 1 representative at the respective time is shown in the direction of the ordinate. The determined luminous intensity is always determined during the switch-on phase of the lighting means 2 through the ambient light sensor 4. In a temporal section 35, the course of the luminous intensity of the room 33 is higher than the intensity of the room determined at the beginning of the temporal course 33 of the light intensity of the room shown, for example, due to an increased proportion of reflecting light.

The temporal course 34 of the change of reflectance (ratio between reflective and incident intensity) in the room 1 determined by means of the method according to the invention is shown in the bottommost diagram of FIG. 2. A measure for the change of the reflection measurement of room 1 is thereby determined in the direction of the vertical axis with consideration to the luminous intensity determined usually for a time during the switch-on phase of the lighting means 2.1, 2.2 by the ambient light sensor 4, and the luminous intensity determined usually for a time during the shut-off phase of the lighting means 2.1, 2.2, as it is determined through the ambient light sensor 4.

The respective luminous intensities determined for a first time during the switch-off period of the lighting means 2 serve as reference for the determination of the change of the reflective measurement of the room 1, each while taking into account the light intensities determined by the ambient light sensor 4 for the second times during the switch-on phase of the lighting means 2.1, 2.2.

Figure 3:
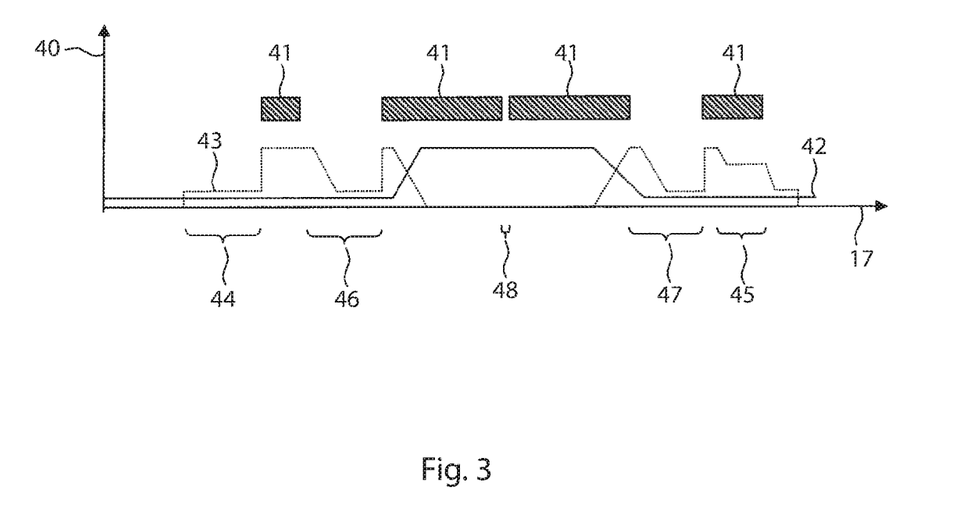
FIG. 3 is a time diagram for an embodiment of a self-teaching system for illuminating a room according to the present invention.

A typical course of the luminous intensity throughout one day is represented in FIG. 3. The time is plotted on the horizontal axis. The luminous intensity 40 is plotted, respectively, in the direction of the vertical axis 36. The presence of one or several persons in the room observed during the time shown is further indicated in FIG. 3 by respective bars.

The solid line in FIG. 3 shows the course 42 of the ambient light 42 throughout the course of the day. The ambient light is strongly characterized by natural ambient light in the course shown, for example, it is constantly low for the time of the darkness, and increases to a value of the ambient light characteristic for the day. In the portrayed course, a linear decrease of the luminous intensity of the ambient light is assumed again up to the value of the ambient light characteristic for the night. The course of the ambient light shown is a grossly simplified representation. Neither the assumption of a linear transition nor the constant ambient light intensities for the respective day and night, particularly take into account further light sources such as street lighting, vehicles, shading through objects, movement of light sources like sun and moon, for example.

The dotted curve 43 represents the course of the brightness (luminous intensity) of the lighting means 2 throughout the day. The brightness of the lighting means throughout the day is thereby controlled time-dependently by a control unit. A time-dependent control is hereby done with a timer, for example. In the example shown, a signal is given by the timer at the beginning of the interval, so that a control unit controls the lighting means 2.1, 2.2 such that a preset minimal brightness is output through the lighting means 2.1, 2.2. It is also assumed for the interval 45 that the brightness of the lighting means 2.1, 2.2 to be emitted is reduced based on a timer signal. The reduction of the brightness is thereby done at an interval 45 to a value lower than the day brightness, which is clearly above the value of the ambient brightness at this time otherwise, as long as people are in the observed room 1.

Through the lighting system according to the invention, a change of one or several people in the room 1 can be detected and the luminous intensity can thus be adapted according to the situation in the room. That is why the luminous intensity is further reduced, once the last person has left the room until the preset minimal luminous intensity has been reached. A process comparable to the interval 45 is shown for the interval 46. As long as the evaluation of the recorded reflection patterns shows that no persons are in the room 1 anymore, the lighting intensity of the lighting means 4 is reduced, even though the low ambient luminous intensity would require an illumination of the room 1 with the lighting means 4. A corresponding situation can be recognized in the interval 47. It also becomes clear that the control of the lighting means 2.1, 2.2 can be done such that with the decision that the last person has left the room, the lighting means 2.1, 2.2 still outputs light for a specific time frame.

Figure 4:
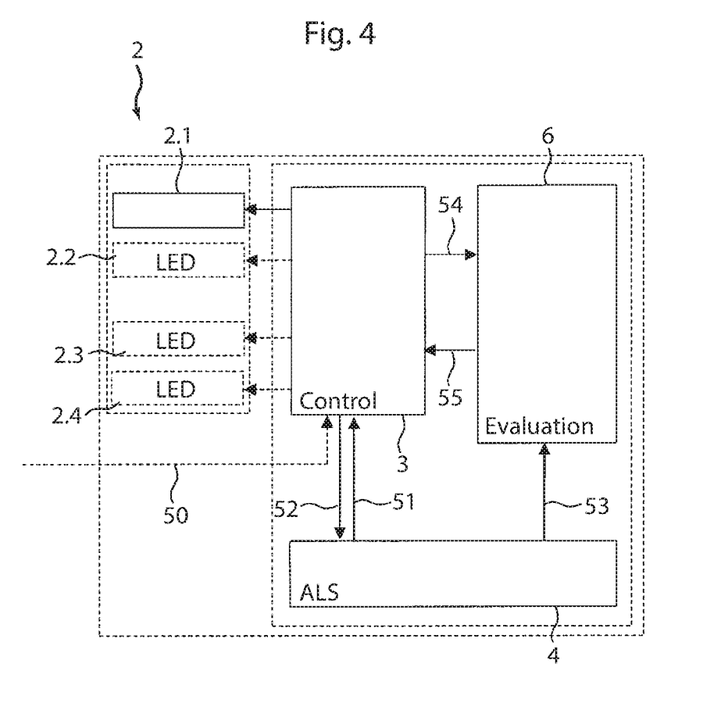
FIG. 4 is a block diagram providing an overview of the structure of a system for illuminating a room according to the present invention.

It is clear from the course 43 of the luminous intensity emitted by the lighting means 2.1, 2.2 that a clear reduction of the absorbed energy can be achieved through the lighting means 2.1, 2.2 by linking a motion detection in accordance with the present invention. Particularly in connection with a time-dependent control and an ambient light sensor 4, savings can be achieved in the energy consumption. What is particularly advantageous is a set-up of a lighting system in integrated form, meaning the lighting system comprises spatially consolidated lighting means 2.1, 2.2, measuring means 4, a control means 3, and an evaluation means 5. Such an integrated setup is shown in FIG. 4. Such a set-up results in a completely autarkic operating autonomous light 2 with an advantageously low effort for the connection with further lighting means for the synchronization and external control units to control the light output according to a need determined by means of additional motion detectors.

A control means 3 is shown in FIG. 4, which controls the light output of a lighting means 2.1, 2.2. The light 2 can comprise one of several lighting means 2.1, 2.2, 2.3, 2.4, . . . . A lighting means is an LED or and LED module, for example, comprising a multitude of LEDs. The light 2 can comprise any form of units emitting light instead of or in addition to LEDs. The system for determining a change in a room 1 furthermore comprises a measuring means 4. The measuring means 4 can include an ambient light sensor ALS, for example, or a group of sensors that record incident light and that output a measuring signal 51 to the control means 3 in accordance with the incident luminous intensity. The control means 3 is additionally equipped to control the measuring means 4. Such a control of the measuring means 4 is the synchronization of the individual measurements, for example, which the measuring means 4 executes, and/or to control the output of the individual luminous intensity measurements through a measurement synchronization signal 52.

The control means 3 can furthermore receive a control signal 50 through an external interface. The control signal 50 can contain time information of an external timer or external information about a light level to be emitted by the lighting means 2, for example.

Another signal 53 with measurement values of the luminous intensity received by the measuring means 53 is transmitted to the evaluation means 6 by the measuring means 3. The evaluation of the measuring values is done in the evaluation means 6 with the inclusion of an evaluation control signal 54. The evaluation control signal 54 may evaluate data about the measuring times of the individual measurements, for instance, and whether the respective measurement was done at a time the lighting means was active (switch-on phase) or during a shut-off phase of the lighting means 2.

In accordance with the method according to the invention, the evaluation means 6 determines a change of an object in the room based on a determined luminous intensity at at least one first time, at which the lighting means 2 doesn't output any light, while taking into account at least one measured luminous intensity at at least one second time, at which the lighting means 2 outputs light during a switch-on phase. The evaluation means 6 especially recognizes whether a person is in the room 1. If the evaluation means 6 decides that there is a person in the room 1, the evaluation means 6 can transmit a respective control input 55 to the control means, for example. This control input can instruct the control means 3, for example, to control the lighting means 2.1, 2.2 with a respective control signal to output light with a specific intensity.

The control signal for the lighting means 2.1, 2.2 can adjust the respective light output by means of a suitable duty cycle of a PWM signal, for example.

Figure 5:
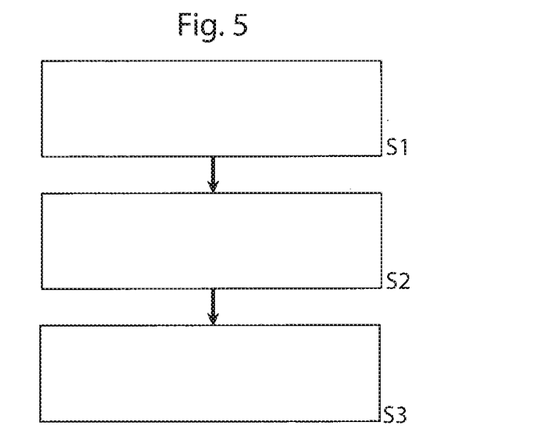
FIG. 5 is a flow chart of a method for illuminating a room according to the present invention.

The method according to the invention to determine a change in a room 1 in a lighting system is now explained by means of FIG. 5.

Initially, in a first step S1 of the method according to the invention, a luminous intensity of the incident light is measured with the measuring means 4 at at least one first time, at which the lighting means 2.1, 2.2 do not output any light. For LEDs as the lighting means 2.1, 2.2, which are controlled through a PWM procedure, the first measurement is done during a respective shut-off phase of the lighting means 2.1, 2.2. The luminous intensity measured is therefore a luminous intensity caused by the ambient light.

In a second step S2, a luminous intensity is determined at at least one second time, at which the lighting means 2.1, 2.2 output light. In the case of an LED as a lighting means 2.1, 2.2 controlled through a PWM procedure, this at least one second time is the respective second measurement of a second measurement performed during the switch-on phase of the lighting means 2.1, 2.2. The luminous intensity measured in the second measurement is therefore a luminous intensity, which is also the ambient light measurable during the switch-off phase and the luminous intensity measurable through reflecting light of the lighting means 2.

Now, according to the invention, a change of an object 12, 13 is detected in the room 1 in an evaluation step S3 based on the luminous intensity determined at the at least one first time and the luminous intensity at the at least second time based on the change of the reflected light.

The measurement done in step S1 makes it thus possible to recognize a change regardless of the use of the ambient light, this step S1 therefore represents a real-time reference for determining a change of the reflected light in the room 1.

Based on this detected change of the reflected light, the evaluation means 6 can perform a classification, for example. The result of this classification can be the decision, for instance, that at least one person is in the room. The evaluation means 6 is preferably designed such that it can distinguish a change of the position of a person from a change of a basic light situation. This differentiation can be learned by training the evaluation means 6, for example.

Such a differentiation can be implemented in a version of the invention in a neuronal network. Basic procedures of pattern recognition and statistics, also known to the person skilled in the art per se, can be used in the evaluation means 6 to make a decision about a change of an object in the room from the measured values of the illumination (luminous intensity).

Longer time intervals, in which persons perform no or only slight movements in the room, can be detected in a version of the method by considering a time sequence of the detected changes of the luminous intensity and trained temporal patterns in the change of the luminous intensity, for example.

A change of the reflective properties of the room 1 can be obtained in a version via a reference of the determined light level during an activation phase of the lighting means 2 in comparison to the determined light level during the switch-off duration of the lighting means 2 regardless of an ambient luminous intensity.

An advantage of the invention is furthermore based on the ability to consider a proportionate luminous intensity in the evaluation step S3 in a simple manner, which was determined in the first step of the measuring 51 for further artificial lighting means with a defined operating frequency located in the room, particularly further lighting means that are controlled in accordance with the PWM procedure.

In an especially beneficial embodiment of the method according to the invention, the light is designed such that it can emit light in at least two different spectrums. Such a design can be achieved in an especially simple manner for lighting means 2.1, 2.2, 2.3, . . . , which are designed as LEDs or LED modules. Such a light 2 is a multi-channel LED module that is designed with at least two LEDs for a different partial spectrum of the entire light emission spectrum covered by the respective multi-channel LED module. With a suitable respective design of the control means 3, the measuring means 4, and the evaluation means 6, the reflection measurement must be executed as a luminous intensity measurement depending on the spectrum of the determined luminous intensity. A respective evaluation in step S3 enables an even finer gradation of the recognition of a change of an object with an increased reliability compared to an evaluation across an equally wide overall spectrum, as the reflective properties of the room have a spectral dependence.

The embodiment portrayed above is a design of the system according to the invention for recognizing a change by means of a lighting system for a room. But the invention can likewise be used outside of a room 1 in a vehicle or outside.

The invention has been described above with reference to particularly advantageous embodiments. The description of the embodiments is not conclusive. Especially the combination of features of embodiments described differently and separately is both possible and advantageous, and is expressly covered as part of the scope of protection of the enclosed patent claims.

What is claimed is:

1. A system for determining a change in a room, the system comprising:
    lighting means (2) for emitting light;
    control unit (3) that controls the light output of the lighting means (2);
    measuring means (4) for determining a luminous intensity;
    an evaluation unit (6), that evaluates the determined luminous intensity and generates a switch signal for the control unit (3) based on the evaluation of the luminous intensity; and wherein the evaluation unit (6) is configured to detect a change of an object in the room based on a determined luminous intensity during at least one first time, when the lighting means (2) emits no light, and a luminous intensity during at least one second time, when the lighting means (2) emits light;
    wherein the measuring means (4) is dedicated to the lighting means (2) and is disposed inside of a joint housing of the lighting means such that the measuring means detects direct and reflected light from ambient light sources light from the lighting means that is reflected as well as incident light from the lighting means, in the joint housing.

2. The system according to claim 1 wherein the system is part of a lighting system, and the control unit (3) and evaluation means (6) as well as the lighting means and the measuring means (4) are contained in the joint housing.

3. The system according to claim 1 wherein the control unit (3) is configured to control the measuring means (4), and to change a light level of the emitted light depending on the detected change of the object.

4. The system according to claim 1 wherein the evaluation unit (6) is configured to determine a change of a light component reflecting on the object from a ratio of the luminous intensity determined at the first time, and a luminous intensity at the second time, in order to determine a presence of a person in the room.

5. The system according to claim 1 wherein the evaluation unit (3) is configured to decide on a presence of a person in the room by learning from the determined luminous intensity at the at least one first time, and a luminous intensity at the at least one second time.

6. The system according to claim 5, wherein the evaluation unit (3) is configured to perform the learning on the basis of a neural network.

7. The system according to claim 1 wherein light at the at least first time comprises ambient light and reflecting light, and that the light at the at least one second time is composed of ambient light.

8. The system according to claim 1 wherein the measuring means (4) comprises a daylight sensor; and the control unit (3) is configured to start a burst operation of the lighting means (2), when the daylight sensor determines a luminous intensity below a daylight threshold and the lighting means are switched off.

9. The system according to claim 1 wherein the evaluation unit (3) is configured to determine a proportion of the determined light, which is produced in the room through further lighting means (2) with a defined operation frequency from a determined luminous intensity at the at least second time.

10. A method for determining a change in a room, having a system, the system comprising:

lighting means (2) that emit light;
a control unit (3) that controls the light emission of the lighting means (2);
measuring means (4) that determine a luminous intensity, wherein the control unit also controls the operation of the measuring means (4);
and an evaluation unit (6) that evaluates the determined luminous intensity and generates a switch signal for the control means (3) based on the evaluation of the luminous intensity;
and wherein the method is characterized in that in one step, a luminous intensity is determined at at least one time, at which the lighting means does not emit any light;
in a further step, a light intensity is determined during at least one second time, when the lighting means emits light; and
in an evaluation step, a change of an object is determined in a room based on the determined luminous intensity at the at least one first time and the luminous intensity at the at least second time;
and wherein the control unit (3) receives a signal (50) containing timing information from an external timer and outputs a measurement synchronization signal (52) to the measuring means (4) in order to synchronize individual light measurements with the control of the lighting means (2).

11. A system for determining a change in a room, the system comprising:

a multi-channel LED lighting module that comprises at least one first LED lighting element and at least one second LED lighting element, wherein the at least one first LED lighting element and the at least one second lighting LED element are each configured to emit light in a light spectrum differing from one another;
control unit (3) that controls the light output of the at least one first LED lighting element and at least one second LED lighting element;
measuring means (4) for determining a luminous intensity in the differing spectrums emitted by the at least one first LED lighting element and at least one second LED lighting element; and
an evaluation unit (6), that evaluates the determined luminous intensity in the differing light spectrums and generates a switch signal for the control unit (3) based on the evaluation of the luminous intensity of the differing light spectrums; and wherein the evaluation unit (6) is configured to detect a change of an object in the room based on a determined luminous intensity for the respective light spectrum during at least one first time, when the respective first or second LED lighting element emits no light, and a luminous intensity during at least one second time, when the respective first or second LED lighting element emits light, and the evaluation unit (6) is configured to evaluate the luminous intensity in each of the spectrums differing from one another, to recognize the change of the object.

* * * * *